May 5, 1936.  E. BURKE ET AL  2,039,387

MULTIPLE CONDUIT SECTION

Original Filed Oct. 7, 1926

Inventors:
Edmund Burke,
John C. Sherman.
by Wright, Brown, Quinby & May
Attys.

Patented May 5, 1936

2,039,387

UNITED STATES PATENT OFFICE 2,039,387

MULTIPLE CONDUIT SECTION

Edmund Burke, Portland, and John C. Sherman, Gorham, Maine, assignors to Brown Company, Berlin, N. H., a corporation of Maine Original application October 7, 1926, Serial No. 139,975, now Patent No. 1,799,672, dated April 7, 1931. Divided and this application March 6, 1931, Serial No. 520,762. In Canada October 15, 1929

3 Claims. (Cl. 138—77)

This application is a division of our application Serial No. 139,975, filed October 7, 1926, pursuant to which Patent No. 1,799,672, was issued April 7, 1931. The invention relates to built-up units of multiple conduit. In the laying of underground or enclosed wires for telephones, power transmission or otherwise, the wires are frequently led through a number of parallel conduits of moderate size, it being usually of advantage to segregate different wires or groups of wires. Consequently there are many installations calling for a series of parallel conduits. Where an installation of this kind is desired, it has been the practice to use tile conduit having multiple passages, or more recently where it is desired to use waterproofed fibrous conduit, sections of single conduit have been built up in the process of laying, suitable blocks being used to space the parallel conduits evenly. The fibrous type of conduit has many advantages over the vitreous type, among them being lightness, cheapness, strength and toughness. Furthermore, the material can be machined so that the ends can be easily shaped to make tight joints. Especially suited for uses of this kind is conduit made by extruding a heated plastic mass of fiber thoroughly mixed with a suitable waterproofing binder and formed into tubular shape as described in Letters Patent No. 1,780,948, granted to John C. Sherman November 11, 1930. Another suitable conduit for the purpose is that which is made by rolling up a sheet of wet pulp under pressure into tubes having walls of homogeneous consistency, drying the tubes, and impregnating them with waterproofing material. But we do not limit ourselves to any particular kind of conduit. Where an installation calls for several parallel conduits, however, the cost of laying has been unnecessarily large. By our invention, we provide made-up sections of multiple conduit. Such sections can be made up of any desired number of single conduits within reasonable limits, and their use greatly facilitates the laying of multiple lines of conduit. They are easily handled, easily alined, and the ends of the individual conduits in the multiple sections may (and preferably do) have machined ends to interfit with corresponding ends of other sections and to form watertight joints.

The sections of multiple conduit may be made up in a variety of ways. In general, we prefer to use spacing material between the individual conduit sections, the individual sections being held against the spacing material by adhesion, by encircling straps or tie members, or by both. Further advantageous features of construction will appear from the description of our invention which follows and from the drawing, of which,—

Figure 1:
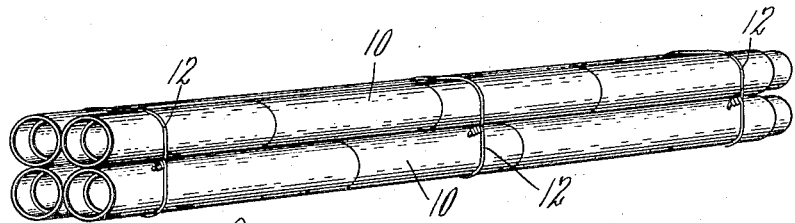
Figure 1 represents in perspective a section of multiple conduit illustrating one embodiment of our invention.

Referring to the drawing in detail, 10 represents lengths of single conduit, preferably of waterproofed fibrous material, such conduit being particularly desirable and suitable for many kinds of service for which vitreous conduit is not so well adapted. These lengths of fibrous tubing or conduit may be grouped about a core 11 and preferably adhere thereto, the adhesion being a result of the use of a film of adhesive material between the core and each individual conduit 10 or a partial fusion or intermingling of the surfaces of the core and the contiguous surfaces of the individual conduit sections. Where the individual conduits are made to adhere to the core, exterior bonds or tie members are not required, but we prefer to use such members to strengthen the assembly, such tie members consisting preferably of wires or strands 12 of any desired material. Instead of wires, bands or straps may be used. If these tie members are of metal, they may be secured by twisting the ends as illustrated in the figures or by spot welding, clamping, or any other desired method.

In assembling a section of multiple conduit, a suitable jig may be used to hold the several single conduit sections in place while core material is troweled, extruded or otherwise deposited in between the single sections to hold the conduits in spaced relation and in some cases to adhere to the conduits to hold the multiple sections together. For core material various light substances may be used, such as cinder concrete, or fibrous mill-scrap and sawdust or the like mixed with a suitable binder. Various binders may be used, such for example, as asphalt, wax tailings or other heat responsive substances, or a soluble substance like water glass. If the conduit themselves are made of a substance containing a thermoplastic binder, it may be preferable to heat the surfaces of the conduits adjacent to the core space immediately prior to the introduction of the core material. This core material also having a thermoplastic ingredient will thus unite more completely and firmly with the material of the conduits themselves. The core material preferably is not extended to the ends of the assembly but a space of a foot or so is left between the end of the core filling and the end of the conduit. This permits the conduit ends to be sprung slightly if necessary to register with the corresponding ends of the next section in line. The practical need for this provision lies in the fact that in jigging up the single conduit sections, slight variations in wall thickness will affect the relative spacing of the conduits so that the mutual alinement of corresponding units in successive sections of multiple conduit cannot always be depended upon to be exact. Tie members 12 may be secured around the assembly of conduits either before or after removal from the jig. These tie members are not essential but add greatly to the strength of the assembly without materially adding to the weight thereof. Each section, after removal from the jig, is preferably dipped in or painted over with a waterproofing compound such as hot gilsonite.

Figure 2:
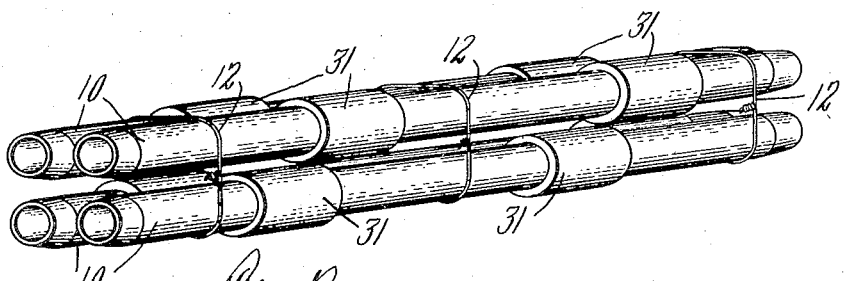
Figure 2 is a perspective view of a slightly different embodiment of the invention.
Figure 3:
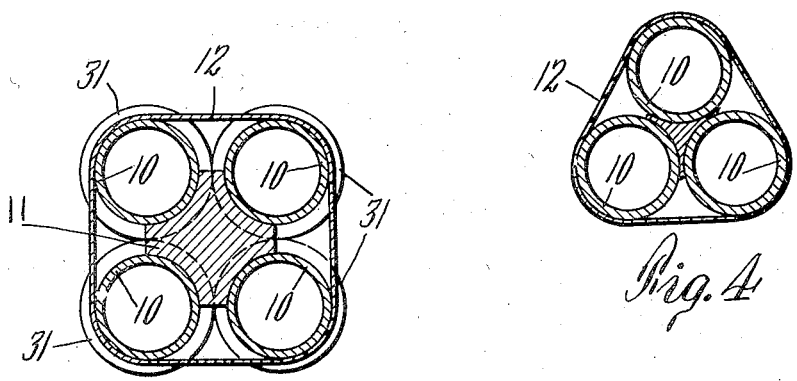
Figure 3 is a sectional view of a multiple conduit section such as is illustrated in Figure 2.
Figure 4:
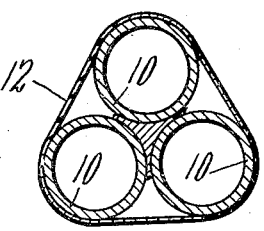
Figure 4 is a sectional view of a triple conduit.

The single conduit sections used in assembling the multiple conduit section may be of a length equal to that of the multiple section. We may, however, employ short pieces of odd length, joining two or more such pieces together end-to-end by suitable tight joints to obtain the desired length for the multiple conduit. These built-up single sections may then be assembled side by side to form a multiple conduit section. By staggering the joints of the built-up single sections, as shown in Figures 1 and 2, so that the intermediate joints in a multiple section do not come in common transverse planes, the multiple section is stiffened. In some cases, as where it is desired to group the single sections close together in the multiple section, as illustrated in Figure 1, the short pieces may be joined with lapped or tapered joints. These leave a flush exterior surface on the single sections. In Figure 2 the short sections are shown as united by couplings 31 into which the ends of the short sections may be screw threaded or otherwise fitted. The use of such couplings necessitates the spacing of the individual conduits a little farther apart than is necessary in the form shown in Figure 1. The lightness and toughness of fiber tubing and the ease with which strong tight joints may be made permit the construction and use of multiple conduit sections of lengths considerably greater than has heretofore been considered practicable. In laying a multiple conduit installation, it can readily be seen that the longer the individual sections, the easier it will be to aline successive sections, and the fewer joints there will be to be made tight. This means a great saving in labor and the expense of laying.

We claim:

1. As a new article of manufacture, a section of multiple conduit comprising a plurality of single conduits assembled in substantially parallel relation, and a mass of core material filling and limited to the space between the conduits for a portion of their length and adhering to each conduit.

2. As a new article of manufacture, a section of multiple conduit comprising a plurality of single conduits assembled in substantially parallel relation, some of said single conduits comprising a plurality of pieces joined end to end, a mass of core material filling and limited to the space between the conduits for a portion of their length.

3. As a new article of manufacture, a section of multiple conduit comprising a plurality of single conduits in substantially parallel relation, and a mass of core material in and limited to the space between the conduits and extending for a portion only of the length thereof, said core material engaging surface areas of said conduits and conforming accurately to the surface irregularities of said areas.

EDMUND BURKE.
JOHN C. SHERMAN.